United States Patent
Geis et al.

(10) Patent No.: US 7,048,107 B1
(45) Date of Patent: May 23, 2006

(54) DRIVING DEVICE

(75) Inventors: Wilhelm Geis, Leutenbach (DE); Manuela Menrath, Winnenden (DE)

(73) Assignee: Atlas Copco Electric Tools GmbH (DE)

( * ) Notice: Subject to any disclaimer, the term of this patent is extended or adjusted under 35 U.S.C. 154(b) by 0 days.

(21) Appl. No.: 09/284,311

(22) PCT Filed: Aug. 26, 1998

(86) PCT No.: PCT/EP98/05432

§ 371 (c)(1),
(2), (4) Date: Apr. 26, 1999

(87) PCT Pub. No.: WO99/10132

PCT Pub. Date: Mar. 4, 1999

(30) Foreign Application Priority Data

Aug. 26, 1997 (DE) .......................... 297 15 257 U

(51) Int. Cl.
*F16D 41/10* (2006.01)
*B60N 2/22* (2006.01)

(52) U.S. Cl. .................................... 192/223.2; 192/44

(58) Field of Classification Search ........... 192/223.2, 192/44; 188/82.2
See application file for complete search history.

(56) References Cited

U.S. PATENT DOCUMENTS

| 2,561,159 | A | * | 7/1951 | Walton | 192/223.2 |
|---|---|---|---|---|---|
| 2,812,044 | A | * | 11/1957 | Cole | 192/223.2 |
| 3,110,381 | A | * | 11/1963 | Leu | 192/223.2 |
| 3,243,023 | A | * | 3/1966 | Boyden | 192/223.2 |
| 3,586,143 | A | | 6/1971 | Hutchinson | |
| 4,901,831 | A | | 2/1990 | Ito et al. | |
| 5,016,501 | A | | 5/1991 | Holzer, Jr. | |
| 5,199,831 | A | * | 4/1993 | Broucksou | 192/44 X |
| 5,248,017 | A | * | 9/1993 | Schwarzbich | 192/223.2 |
| 5,460,253 | A | * | 10/1995 | Ritter et al. | 192/223.2 |
| 5,522,488 | A | * | 6/1996 | Schwarzbich | 192/223.2 |
| 5,551,927 | A | * | 9/1996 | Enzmann et al. | 475/265 |
| 5,788,021 | A | * | 8/1998 | Tsai | 192/223.2 X |
| 5,794,479 | A | * | 8/1998 | Schwarzbich | 192/223.2 X |
| 5,896,973 | A | * | 4/1999 | Hochmuth et al. | 192/223.2 |
| 5,950,783 | A | * | 9/1999 | Cahill | 192/26 |

FOREIGN PATENT DOCUMENTS

| DE | 44 47 480 | 6/1996 |
|---|---|---|
| DE | 298 00 163 | 5/1998 |
| EP | 0 792 723 | 9/1997 |
| WO | WO 96/20352 A1 * | 7/1996 |

* cited by examiner

*Primary Examiner*—Rodney H. Bonck
(74) *Attorney, Agent, or Firm*—Robert W Becker & Associates; Robert W Becker

(57) ABSTRACT

A shaft locking device for a motor-driven, hand-guided work tool spindle has a driven member fixedly connected thereto, a freewheel with locking members, a ring fixedly connected to the housing and engaged by the locking members in both rotating directions, a drive member coaxially arranged to the spindle with unlocking members cooperating with locking members releasing when the driving member is engaged, thereby releasing the driven member from the ring. Drive member cams are spatially separated from unlocking members wherein they penetrate the locking member. Driven members have catch openings such that both drive and driven members also have torque-transmitting catch surfaces for a motor-driven action of the spindle so that the catch surfaces have a larger distance from one another in a neutral position of the drive member than between the unlocking members and the locking members.

15 Claims, 3 Drawing Sheets

DRIVING DEVICE

BACKGROUND OF THE INVENTION

The invention relates to a shaft locking device for the spindle of a motor-driven, hand-guided work tool.

A shaft locking device of the aforementioned kind is described in U.S. Pat. No. 3,243,023 which comprises a drive member with four unlocking elements for the locking members of a freewheel and where the unlocking elements are simultaneously designed as cams for engaging a driven member. The torque-transmitting surfaces of the cams and the driven member are designed to be very small in this solution and they are, therefore, subject to wear.

It is an object of the invention to create a shaft locking device for the spindle of a motor-driven, hand-held work tool that has a long service life.

SUMMARY OF THE INVENTION

Due to the spacial separation of unlocking elements and cams, there is space for sufficiently dimensioned torque-transmitting drive surfaces which are practically not subject to any wear.

Because of the one-piece design of the spindle and its penetration of the drive member and the driven member, it has a simple design and a stable support. This support of the spindle in connection with a loosely dimensioned support of the drive member on the spindle contributes to the long service life and the efficiency of the work tool, particularly if the drive member is embodied as a toothed wheel. When its teeth are made of plastic, there are noise-related advantages.

Because the axial cams penetrate the catch openings, the entire torque transferring drive surfaces are always active, even in the event of axial mounting deviations of the spindle.

Because of the positioning of the unlocking members and of the cams, manufacturing advantages exist for turning and milling the drive member. The cams can axially or radially penetrate or extend into the catch openings.

The deep-drawing or extruding of the driven member offers also advantages in regard to manufacturing the cams for the locking members and to flattening of the hub. The driven member can also be embodied as a thick disc which is preferably made of sintered steel. This realizes a particularly low wear and safe operation of the shaft locking device. The number of the locking members depends on the magnitude of the operational load.

The fixedly driven closing ring serves to limit the axial movement of the locking members of the free wheel and, thereby, its noise development. This is particularly important with hammer devices. In the case of different length ratios, the fixedly driven closing ring can be substituted by a standardized disc and, in the event that no hammer device is present, it can even be left out.

Advantageously, the cam surfaces of the cams are radially aligned with the drive surfaces of the catch openings. This provides favorable torque transmission and wear conditions.

A particularly torsionally strong connection between the driven member and the spindle is achieved when the driven member is positive-lockingly connected to the spindle.

Advantageously, the driven member is force-lockingly connected to the spindle. This can be achieved by a press fit, for example. Thereby, a slip-clutch-like slip between the driven member and the spindle is possible on an extreme load acting on the spindle so that a destruction due to breaking-stress can be avoided.

BRIEF DESCRIPTION OF THE DRAWINGS

More features can be taken from the further claims. The drawings schematically illustrate the embodiments of the invention which are described in the following. It is shown in:

DESCRIPTION OF THE PREFERRED EMBODIMENTS

Figure 1:
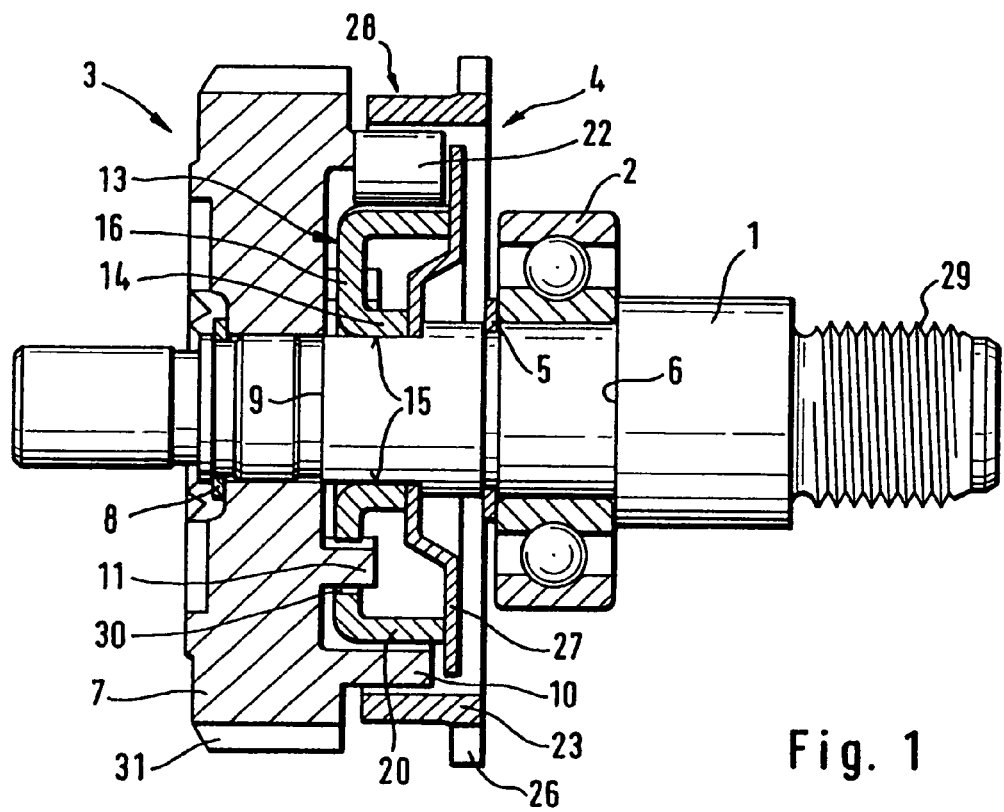
FIG. 1 a longitudinal section of the shaft locking device.
Figure 2:
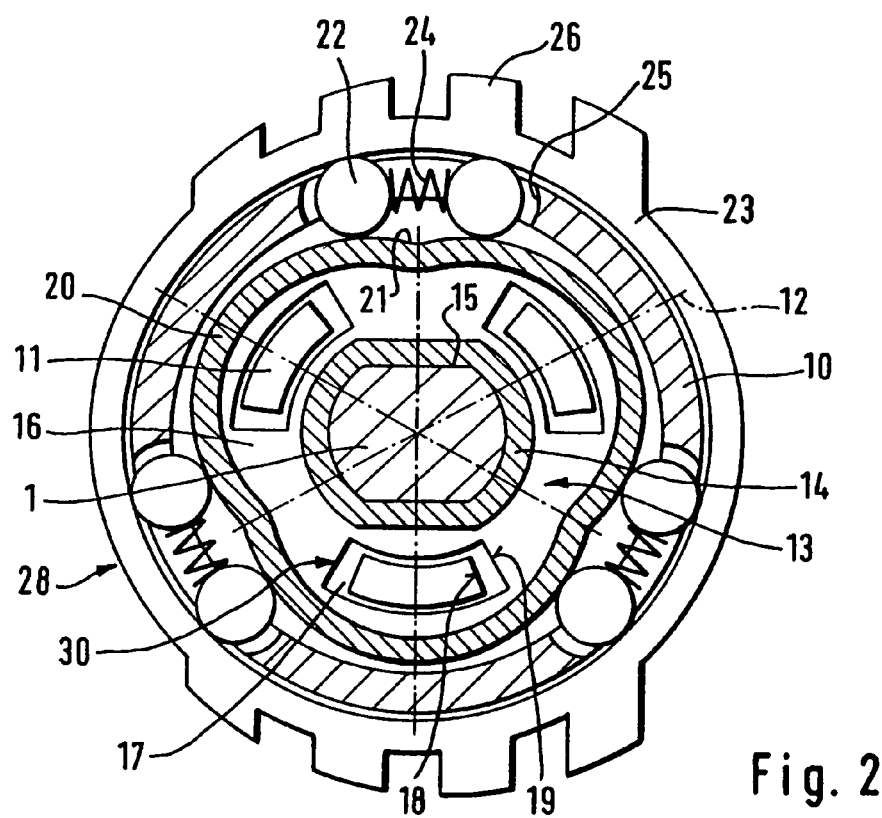
FIG. 2 a cross-section of the shaft locking device.

FIGS. 1 and 2 show a spindle 1 with a thread 29 for the drill chuck and a ball bearing 2 as well as a drive member 3 and a driven member 4.

The interior ring of the ball bearing 2 is axially supported on a shoulder 6 of the spindle 1 by a locking ring 5. A second bearing provided at the driving end of the spindle 1 is not illustrated.

The driving member 3 consists of a toothed wheel 7 that has an end gearing and is supported on the spindle 1. The toothed wheel 7 is axially fixed with axial play by a further locking ring 8 and a shoulder 9 of the spindle 1. For noise-related reasons, the gearing can be comprised of plastic. At the end face of the toothed wheel 7 facing the driven member 4, three unlocking members 10 and three axial cams 11 are arranged in pairs concentrically with respect to one another. The three pairs each have a common center line 12, and neighboring center lines 12 are provided at equal spacings.

The driving member 3 can also be embodied as a planetary gearing and be provided with a two-position gear box.

The driven member 4 is provided with a deep-drawn, pot-shaped sheet metal member 13, whose hub 14 is fixedly connected to the spindle 1 by two flattened portions 15. The hub 14 can also be fixedly connected to the spindle 1 by a press fit or other kind of frictional connection or by positive locking. In the wall 16 of the sheet metal member 13 facing the drive member 3, three catch openings 30 embodied as ring segments 17 are provided which are radially engaged with rotary play by the three axial cams 11 of the toothed wheel 7. The cam surfaces 18 and drive surfaces 19 of the sheet metal member 13, which face one another in the direction of rotation, are radially aligned and are positioned opposite one another with a clearance.

The sheet metal member 13 is provided with an outer ring-shaped wall 20 having an outer shape that is embodied as cams 21 for the locking members 22. The locking members 22 are positioned as pairs in the area between the catch openings 30 and are arranged between the outer wall 20 and a ring 23 fixedly attached to the housing. The locking members 22 are being pressed apart by spring elements 24 (for example, metal or plastic springs) and are held in a clamping position on the cams 21. The cams 21, the locking members 22, and the ring 23 attached to the housing together form a freewheel 28. The number of the locking member pairs is dependent on the operational torque to be expected.

The unlocking members 10 embrace the outer, ring-shaped wall 20 of the metal member 13 at a spacing. They are provided at their end faces 25 facing the locking members 22 a shaped surface matching the locking members 22. The distance between the shaped surface and the locking members 22 is smaller than the one between the cam surfaces 18 and the drive surfaces 19.

The ring 23, fixedly attached to the non-represented housing of the work tool, is positive-lockingly connected, for example, by a toothed ring 26.

The sheet metal member 13 is provided at the side facing away from the driven member 4 with a closing member 27 that is fixedly connected to the spindle 1 and limits the axial movement of the locking members 22 and, thereby, the resulting noise development. This is particularly important with hammer devices. If this is missing, the closing member 27 can be eliminated.

Figure 3:
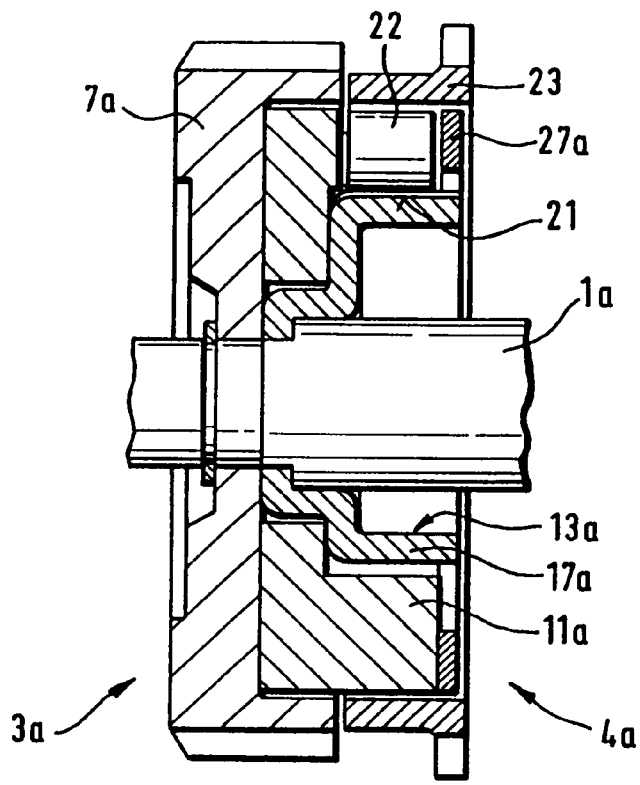
FIG. 3 a longitudinal section of another shaft locking device.
Figure 4:
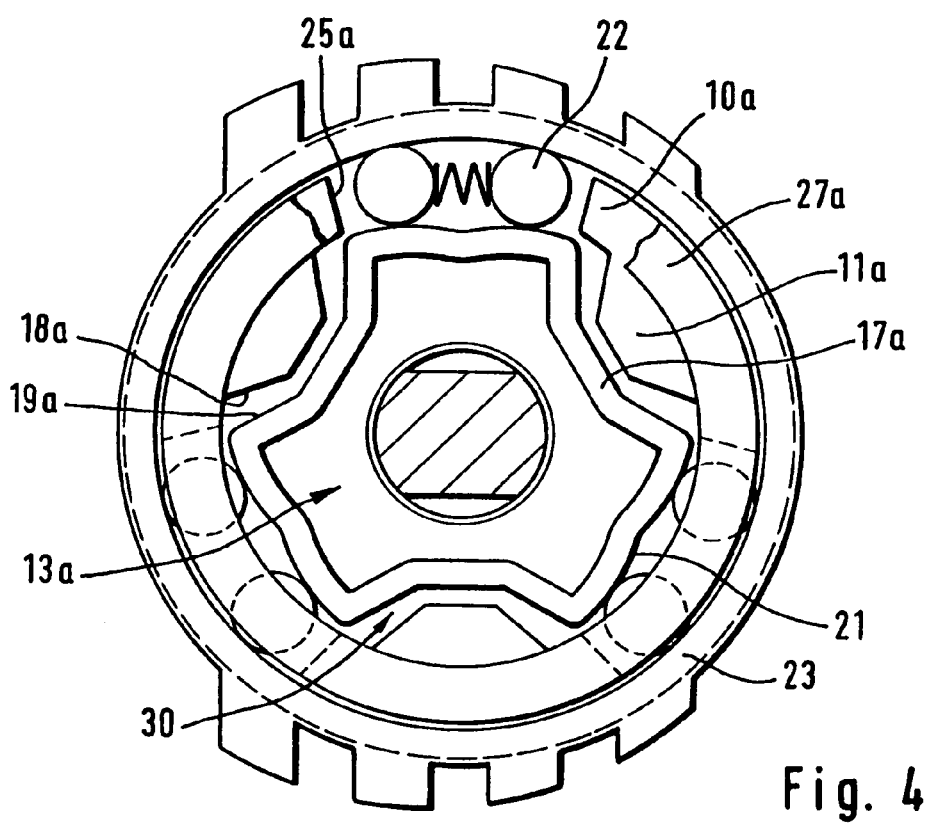
FIG. 4 a cross-section of another shaft locking device.

FIGS. 3 and 4 illustrate another version of the shaft locking device. The same parts carry the same designation as in FIGS. 1 and 2, analogous parts carry a designation extended by an "a".

In this version, differently designed cams 11a of a differently designed toothed wheel 7a of a differently designed drive member 3a engage with play corresponding radial recesses 17a of an extruded member 13a belonging to a differently designed driven member 4a. This extruded member 13a is fixedly connected to a different spindle 1a.

At the circumference of the extruded member 13a, between the radial recesses 17a, cams 21 (according to FIGS. 1 and 2) are provided that can be connected by locking members 22 to the ring 23 fixedly attached to the housing. The locking members 22 are held axially by a closing member 27a that is connected to the differently designed cams 11a.

The torque of the drive motor is transmitted by differently designed cam surfaces 18a to differently designed drive surfaces 19a of the extruded member 13a.

Differently designed unlocking members 10a embrace the extruded member 13a at a spacing. The distance between the differently designed end surfaces 25a of the differently designed unlocking members 10a facing the locking members 22 and the locking members 22 is smaller than between the differently designed cam surfaces 18a and the differently designed drive surfaces 19a of the extruded member 13a.

Figure 5:
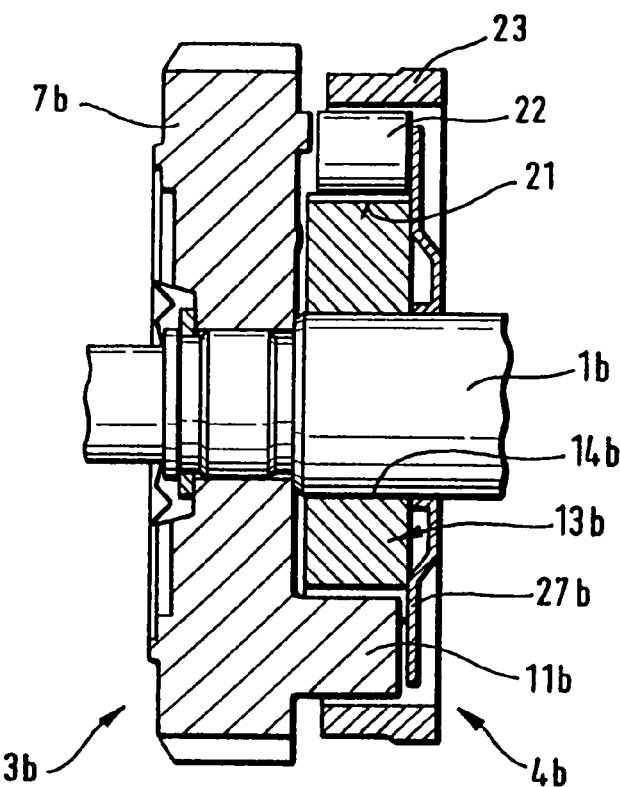
FIG. 5 a longitudinal section of a preferred further embodiment of the shaft locking device, FIG. 6 a cross-section of the preferred further embodiment of the shaft locking device.
Figure 6:
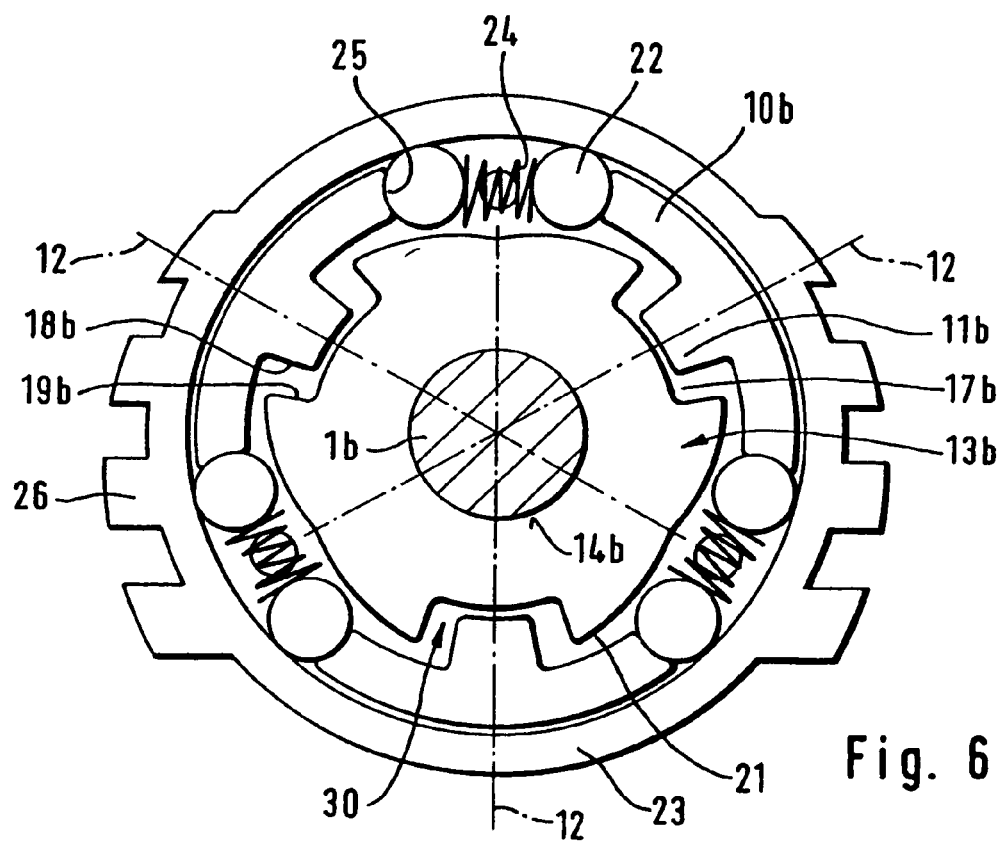

FIGS. 5 and 6 illustrate another preferred embodiment of the shaft clamping device. The same parts carry the same designation as in FIGS. 1 and 2, analogous parts carry a designation extended by a "b".

In this embodiment, the cams 11b of a different toothed wheel 7b are similarly designed as the cams 11a shown in FIGS. 4, whereby differently designed cam surfaces 18b of the cams 1b are approximately radially aligned with different drive surfaces 19b of the catch opening 30. These are embodied as differently designed radial recesses 17b. The cams 11b project radially and axially with a play into the corresponding recesses 17b of a differently designed driven member 4b which is embodied as a thick disc 13b. The driven member 4b is provided with a different hub 14b which is fixedly and force-lockingly connected to a different spindle 1b by press fit.

At the circumference of the disc 13b dovetailed cams 21 according to FIGS. 1 to 4 are provided between the radial recesses 17b. The cams 21 can be connected to the ring 23, fixedly attached to the housing, by locking members 22. The locking members 22 are held axially by a differently designed closing member 27b which is fixedly connected to the spindle 1b.

The torque of the drive motor is transmitted by different cam surfaces 18b to different drive surfaces 19b of the disc 13b.

Different unlocking elements 10b embrace the disc 13b at a spacing. The distance to the end surfaces 25 of the unlocking members 10b facing the locking members 22 is smaller than between the different cam surfaces 18b and the different drive surfaces 19b of the disc 13b. In this embodiment, the locking members 22 rest against the corresponding ends 25 of the different unlocking members 10b, due to the spring action of the spring element 24 arranged between them.

The illustrated shaft locking devices operate as follows:

On operation of the motor, the toothed wheel 7, 7a, 7b is rotated on the spindle 1, 1a, 1b. Thereby, first, the first locking elements 22 as viewed in the direction of rotation are shifted into the recess of the cams 21 by the unlocking members 10, 10a, 10b and are thereby unlocked. Only then, the cam surfaces 18, 18a, 18b engage the drive surfaces 19, 19a, 19b of the driven member 4, 4a, 4b whereby also the second locking member 22 and, thereby, the freewheel 28 as an entity are unlocked. The spindle 1, 1a, 1b, together with the drive member 3, 3a, 3b and the driven member 4, 4a, 4b, can now freely rotate and transmit torque.

When the drive of the spindle 1, 1a, 1b rests, the axial cams 11, 11a, 11b and the unlocking members 10, 10a, 10b are positioned in neutral position without any contact to the driven member 4, 4a, 4b and the locking members 22. The latter are held in a locking position by the spring elements 24. On rotating the spindle 1, 1a, 1b by hand, one of the locking members 22 is engaged in the direction of the locking position and the other one in the unlocking direction, respectively, whereby the locking members 22 switch their function when the direction of rotation is changed. In this manner, a firm rotation connection to the housing of the work tool is always present when the spindle 1, 1a, 1b is rotated manually. This situation can be utilized for opening or closing, or screwing on and off the drill chuck with one hand. Thereby, a double bush drill chuck is not required which is expensive and has to be handled with both hands. Another advantage of the shaft locking device is that a screw can be manually screwed in and out by using the work tool as an effective screw driver.

The specification incorporates by reference the entire disclosure of German priority document 297 15 257.2 of Aug. 26, 1997, as well as of International Application PCT/EP98/05432 of Aug. 26, 1998.

The present invention is, of course, in no way restricted to the specific disclosure of the specification and drawings, but also encompasses any modifications within the scope of the appended claims.

The invention claimed is:

1. A shaft locking device for a spindle (1,1a,1b) of a motor-driven, hand-guided work tool, said shaft locking device comprising:
a spindle (1,1a,1b);
a driven member (4,4a,4b) fixedly connected to said spindle (1,1a,1b);
a freewheel (28) having locking members (22);
a ring (23), fixedly connected to a housing, wherein said locking members (22) engage said ring (23) in both rotating directions of said spindle (1,1a,1b);
a drive member (3,3a,3b) coaxially arranged to said spindle (1,1a,1b) and provided with unlocking members (10,10a,10b), wherein said unlocking members (10,10a,10b) co-operate with said locking members (22) in order to release said locking members (22) when said drive member (3,3a,3b) is driven such that said driven member (4,4a,4b) is released from said ring (23) and is rotatable;

said driven member (4,4a,4b) and said drive member (3,3a,3b) having torque-transmitting catch surfaces (18,18a,18b,19,19a,19b) for a motor-driven drive action of said spindle (1,1a,1b), whereby said catch surfaces (18,18a,18b,19,19a,19b) have a larger distance from one another in a neutral position of said drive member (3,3a,3b) than a distance provided between said unlocking members (10,10a,10b) and respectively associated ones of said locking members (22);

said drive member (3,3a,3b) having cams (11,11a,11b) that are spatially separated from said unlocking member (10,10a,10b), wherein said cams (11,11a,11b) penetrate into said driven member (4,4a,4b), and wherein said drive member (3,3a,3b) is a toothed wheel (7,7a, 7b) supported on said spindle (1);

said driven member (4,4a,4b) having catch openings (30);

wherein said torque-transmitting catch surfaces (18,18a, 19,19a,19b) are formed by cam surfaces (18,18a,18b) of said cams (11,11a,11b) and by drive surfaces (19, 19a,19b) of said catch openings (30) facing said cam surfaces (18,18a,18b) in a respective rotational direction of said spindle (1,1a,1b).

2. A shaft locking device according to claim 1, wherein said spindle (1, 1a, 1b) is a one-piece member and penetrates said driven member (4, 4a, 4b) and said drive member (3, 3a, 3b), wherein said spindle (1, 1a, 1b) serves as a support for said drive ember (3, 3a, 3b).

3. A shaft locking device according to claim 1, wherein said toothed wheel (7, 7a, 7b) has plastic teeth (31).

4. A shaft locking device according to claim 1, wherein said cams (11) extend axially or radially into said catch openings (30) and wherein said catch openings (30) are embodied as ring segments (17).

5. A shaft locking device according to claim 1, wherein said cams (11a, 11b) extend axially or radially into said catch openings (30) and wherein said catch openings (30) are embodied as radial recesses (17a, 17b).

6. A shaft locking device according to claim 1, wherein said unlocking members (10, 10a, 10b) and the cams (11, 11a, 11b) are arranged concentrically to one another, wherein said unlocking members (10, 10a, 10b) embrace said driven member (4, 4a, 4b) at a spacing.

7. A shaft locking device according to claim 1, wherein said drive member (3, 3a, 3b) has at least two pairs of symmetrically embodied ones of said unlocking members (10, 10a, 10b) and said cams (11, 11a, 11b) wherein each one of said pairs has a common center line (12) that is positioned at an equally spaced angle to neighboring ones of said center lines (12).

8. A shaft locking device according to claim 1, wherein said driven member (4, 4a, 4b) is embodied as a deep-drawn sheet metal member (13) or as an extruded member (13a) or as a thick disc (13b).

9. A shaft locking device according to claim 8, wherein said sheet metal member (13) or said extruded member (13a) or said disc (13b) is provided with circumferential cams (21) for said locking members (22).

10. A shaft locking device according to claim 8, further comprising a closing member (27, 27b) fixedly attached to said driven member (4, 4a, 4b), wherein said closing member (27, 27b) has a clearance-free contact to said sheet metal member (13) or to a thick disc steel member (13b) and has axial clearance to said locking members (22).

11. A shaft locking device according to claim 1, wherein said cams (21) and associated one of said locking members (22) are arranged in pairs.

12. A shaft locking device according to claim 1, further comprising spring elements (24) arranged between said locking members (22).

13. A shaft locking device according to claim 1, wherein said cam surfaces (18, 18b) of said cams (11, 11b) are radially aligned with said drive surfaces (19, 19b) of said catch openings (30).

14. A shaft locking device according to claim 1, wherein said driven member (4, 4a) is positive-lockingly connected to said spindle (1, 1a).

15. A shaft locking device according to claim 1, wherein said driven member (4b) is force-lockingly connected to said spindle (1b).

* * * * *

UNITED STATES PATENT AND TRADEMARK OFFICE
CERTIFICATE OF CORRECTION

PATENT NO. : 7,048,107 B1
APPLICATION NO. : 09/284311
DATED : May 23, 2006
INVENTOR(S) : Geis et al.

It is certified that error appears in the above-identified patent and that said Letters Patent is hereby corrected as shown below:

<u>Title page,</u>
Item [54] should read as follows:

[54] SHAFT LOCKING DEVICE

Signed and Sealed this

Twenty-second Day of August, 2006

JON W. DUDAS
*Director of the United States Patent and Trademark Office*